Figure 1:
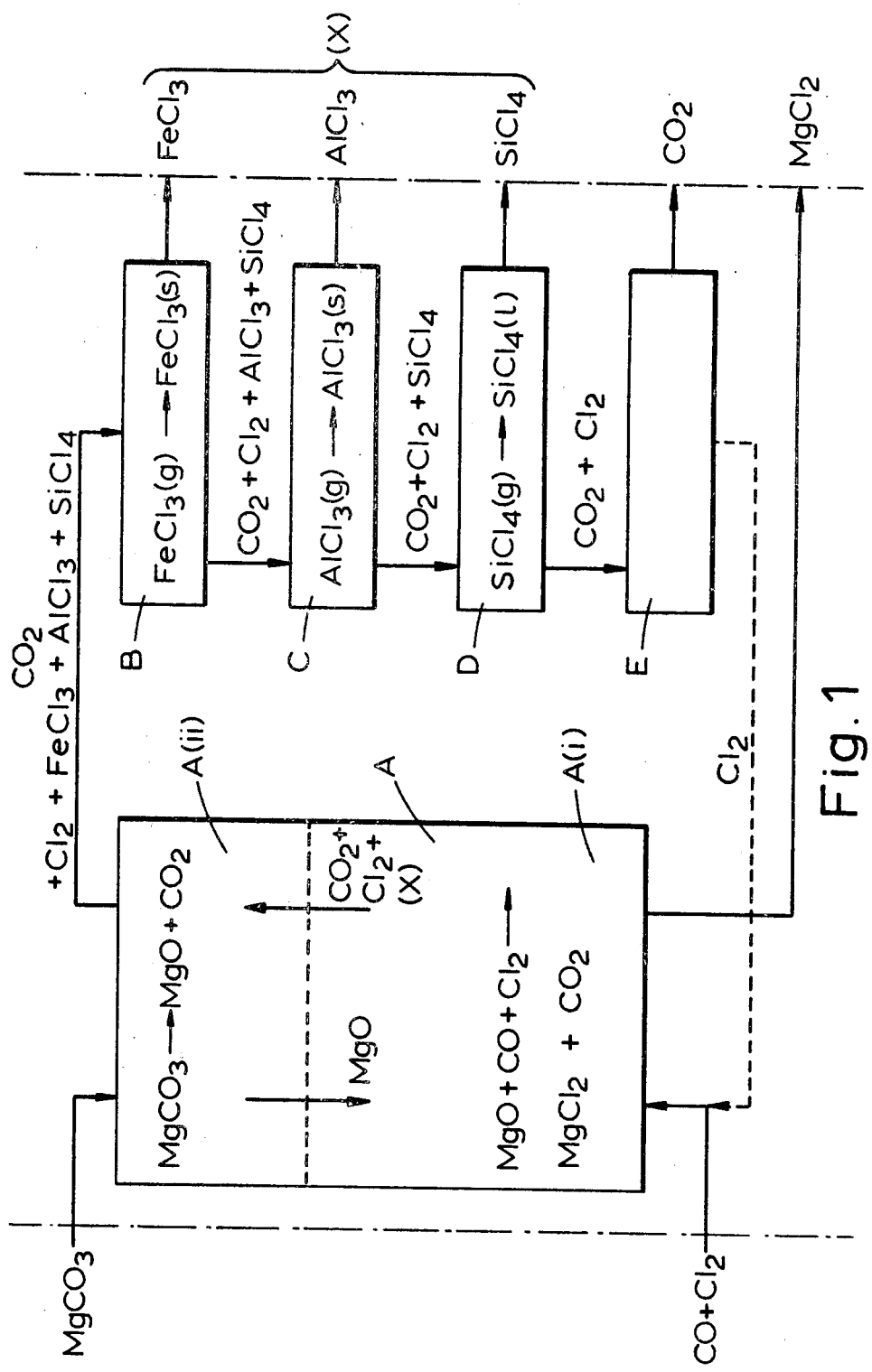

United States Patent [19]

Shackleton, deceased et al.

[11] 4,269,816
[45] May 26, 1981

[54] PREPARATION OF ANHYDROUS MAGNESIUM CHLORIDE

[75] Inventors: Charles E. E. Shackleton, deceased, late of London, England; by Edward A. B. Shackleton, executor, Lymington, England; Anthony J. Wickens, Rudgwick, England; John H. W. Turner, via Stockport, England

[73] Assignee: Mineral Process Licensing Corp. BV, The Hague, Netherlands

[21] Appl. No.: 61,416

[22] Filed: Jul. 27, 1979

[30] Foreign Application Priority Data

Jul. 27, 1978 [GB] United Kingdom ............... 31427/78

[51] Int. Cl.³ .............................................. C01F 5/34
[52] U.S. Cl. .................................................. 423/498
[58] Field of Search ........................................ 423/498

[56] References Cited

U.S. PATENT DOCUMENTS

| | | | |
|---|---|---|---|
| 1,331,257 | 2/1920 | Heap | 423/498 |
| 1,933,499 | 10/1933 | Moschel | 423/498 |
| 2,355,367 | 8/1944 | Cooper | 423/498 |
| 2,384,479 | 9/1945 | Lepsoe | 423/498 |
| 2,567,419 | 9/1951 | Bengston | 423/497 |
| 3,411,880 | 11/1968 | Kent | 423/177 |

FOREIGN PATENT DOCUMENTS

| | | | |
|---|---|---|---|
| 379203 | 8/1923 | Fed. Rep. of Germany . | |
| 502646 | 7/1930 | Fed. Rep. of Germany | 423/498 |
| 682303 | 5/1930 | France | 423/498 |
| 333741 | 8/1930 | United Kingdom | 423/498 |
| 582332 | 11/1946 | United Kingdom . | |
| 582333 | 11/1946 | United Kingdom . | |
| 582357 | 11/1946 | United Kingdom . | |

OTHER PUBLICATIONS

*Engineering and Mining Journal,* Oct. 1943, pp. 61–67.

Primary Examiner—Brian E. Hearn
Attorney, Agent, or Firm—Barry G. Magidoff

[57] ABSTRACT

The invention relates to a process for the preparation of anhydrous magnesium chloride from magnesium carbonate preferably magnesium carbonate ores such as magnesite. The process comprises reacting solid magnesium carbonate pieces preferably screened ore in a packed bed reactor comprising the magnesium carbonate pieces with gaseous chlorine in the presence of carbon monoxide at a temperature above the melting point of magnesium chloride and below 1200° C. The off-gas predominantly carbon dioxide is withdrawn from above the packed bed and molten anhydrous magnesium chloride is withdrawn from below the packed bed. The invention provides a process having low energy requirements which can be applied industrially on a continuous basis using simple apparatus.

13 Claims, 2 Drawing Figures

PREPARATION OF ANHYDROUS MAGNESIUM CHLORIDE

This invention relates to the production of anhydrous magnesium chloride by the chlorination of materials containing oxidic magnesium compounds, more especially magnesite.

It is widely recognised (vide the report from International Conference on Energy Conservation at the Massachusetts Institute of Technology in May 1977) that the size of the current market for magnesium could be substantially increased if the current difference in production cost between magnesium and aluminium could be reduced by a relatively modest amount. A major element in this cost differential is attributable to the greater energy consumption in the production of primary magnesium over that needed for primary aluminium. One important example of potential market growth for magnesium lies in the automotive industry, where energy conservation programmes aim for a reduction in overall weight of the motor vehicle. A component manufactured in magnesium alloy can result in weight savings of up to one-third over its aluminium counterpart.

One of the main methods of making magnesium metal in current industrial use is the so-called Dow Seawater Process, in which magnesium hydroxide is precipitated from seawater, chlorinated, dehydrated to $MgCl_2.1\frac{1}{2}H_2O$ and converted to magnesium by electrolysis in a bath of fused salts. It has recently been estimated in a joint U.S. Bureau of Mines/Batelle study entitled "Energy Use Patterns in Metallurgical and Non-metallic Mineral Processing", that the Dow process consumes $358 \times 10^6$ BTU per short ton of magnesium produced. Of this energy consumption, about 40% is used up in the process stages leading up to electrolysis. Thus, if it were practicable to manufacture $MgCl_2$ by a low energy method, and particularly if the resulting $MgCl_2$ were anhydrous, then there would be scope for energy savings in the production of magnesium of the order of 40% as compared with the Dow process.

Another process which was of considerable quantitative importance in the U.S.A. during the special circumstances of World War II was the Basic Magnesium (MEL) Process, operated at Henderson, Nev. Magnesite ore was calcined to MgO, mixed with pulverised coke and formed into pellets. The pellets were heated and then fed into electrically heated chlorinators. Molten anhydrous magnesium chloride was produced according to the equation below:

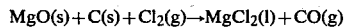
$$MgO(s) + C(s) + Cl_2(g) \rightarrow MgCl_2(l) + CO(g)$$

Although the Basic Magnesium Process was technically successful, with a maximum output of 10% in excess of its rated out put of 112 million lb/year, its energy consumption for the production of fused magnesium chloride was high since it was necessary to decompose $MgCO_3$ to MgO by calcination, to preheat the MgO pellets and to electrically heat the chlorinators. The production of magnesium chloride by this process ceased shortly after World War II.

Variations on this basic process have been described by I. G. Farbenindustrie AG, for example, in German Pat. No. 502,646 and British Pat. No. 333,741.

German Pat. No. 502,646 described the production of anhydrous magnesium chloride by carbochlorination melts containing anhydrous magnesium chloride, carnallite or other $MgCl_2$-containing compounds in a trickle tower. The carbo chlorinating gases described include hydrogen chloride, chlorine, phosgene or agents which combine the effect of chlorine and carbon monoxide such as phosgene or its formation mixture consisting of chlorine and carbon monoxide. The trickle tower was set out with the appropriate quantity of carbon e.g. charcoal powder and the tower was preferably electrically heated. The melts used in this process could contain magnesite as illustrated in Example 2 of the German Patent.

British Pat. No. 333,741 also described the preparation of anhydrous practically oxide-free magnesium chloride from pieces of magnesite or similar minerals which comprises passing chlorine gas into a loose mixture of pieces of magnesite or the like and pieces of carbon. A similar type of process is described in U.S. Pat. No. 1,933,499 to Moschel in which a loose unbonded mixture of crude pieces of magnesite and of charcoal is arranged above a layer of coarse pieces of mechanically-resistant and chemically-inert carbon. Chlorine is passed through the heated carbon layer into the preheated mixture and molten magnesium chloride is withdrawn from a lower level of the carbon layer.

We have now devised an improved chlorination process for the manufacture of anhydrous magnesium chloride which has a particularly low energy requirement compared with those of previously established chlorination processes and which is capable of being applied industrially using reaction equipment of relative simplicity.

This invention provides a process for the preparation of anhydrous magnesium chloride, wherein solid magnesium carbonate pieces are reacted with gaseous chlorine in the presence of gaseous carbon monoxide at a temperature above the melting-point of $MgCl_2$ and below 1200° C. in a packed bed reactor, comprising the solid magnesium carbonate pieces, wherein carbon dioxide is withdrawn from above the packed bed and wherein molten anhydrous magnesium chloride is withdrawn from below the packed bed.

The reactor used in the present invention is one of the "packed bed" type consisting essentially of solid magnesium carbonate pieces, preferably raw magnesite pieces. The solid magnesium carbonate pieces are fed from the top of the reactor and gaseous chlorine and carbon monoxide are introduced from the bottom of the reactor in countercurrent to the magnesium chloride produced which is withdrawn from below the packed bed. The solid magnesium carbonate pieces are thus in the form of a substantially-static or slowly-moving bed wherein the feed material is introduced from the top and the product is withdrawn from the bottom. The interstices between the solid magnesium carbonate pieces define flow paths for the product magnesium chloride. The magnesium carbonate must be substantially powder-free, the pieces being sufficiently large to provide the interstices such that the product, magnesium chloride, can flow downwards without impeding the flow rate upwards of the reactant gases as described hereinafter.

Use of a packed bed type of reactor ensures good solid/gas contact while permitting the product to flow freely away from the solid reactant. According to the invention the packed bed can consist only of the magnesium carbonate solid material. The packed bed does not contain carbon but can contain other solids such as inert materials which do not take part in the reaction. This affords certain important advantages and, in particular, the process according to the present invention requires low energy input as compared with the proposals previously discussed. For example, the Basic Magnesium (MEL) Process requires energy for pulverising and pelletising the coke and magnesite and the process described in German Pat. No. 502,646 requires heat energy for the production of the magnesium chloride melts used as starting material. Furthermore, the MEL process requires heat to calcine the magnesium carbonate to produce the magnesium oxide used as feed material in the process. This heat energy is required in addition to the heat required for the subsequent chlorination step. In contrast, the process according to the invention uses screened solid pieces of raw magnesite or similar magnesium carbonate mineral and no heat energy is required for the preparation of the feed material.

The process according to the present invention is also favorable as regards energy considerations when compared with processes such as those described in British Pat. No. 333,741 and U.S. Pat. No. 1,933,499 which require solid carbon to be present in the reactor.

This can be illustrated by comparison of the process according to the invention which is represented by the reaction equation (1)

$$MgCO_3 + CO \pm Cl_2 \rightarrow MgCl_2 + 2CO_2 \qquad (1)$$

with a conventional process using solid carbon represented by the reaction equation (2)

$$MgCO_3 + C + Cl_2 \rightarrow MgCl_2 + CO + CO_2 \qquad (2)$$

At temperatures within the range according to the present invention the energy requirement of the reaction according to equation (1) is considerably reduced compared with the energy requirements of the reaction according to equation (2) as is demonstrated hereinafter by comparison of the overall heat balance of the two processes.

As previously indicated even a modest saving in energy for the production of magnesium could substantially increase the commercial viability of producing magnesium as opposed to aluminium. Accordingly we believe that the present invention which is a low energy requiring reaction constitutes a potentially commercially interesting process.

The fact that, in accordance with the invention, the packed bed contains only raw magnesite can also be advantageous in that introduction of fresh feed material in continuous operation of the process is simplified and we have found that formation of clinker in the reactor may also be reduced.

A further advantage of the process according to the invention arises from the evolution of carbon dioxide. The carbon dioxide evolved passes up the packed bed and is expelled from the top of the reactor. We have observed that the pieces of magnesite retain their shape during the evolution of carbon dioxide and are not disintegrated into a powder. However, the porosity, and hence the effective service area of the packed bed material is considerably increased by the evolution of carbon dioxide. This enhances the effectiveness of the chlorination reaction which relies upon good solid/gas contact.

The reaction conditions of the process according to the invention will now be described in more detail.

By comparison with known industrial applications of packed bed technology e.g. blast furnace practice, it is probable that there will be both a lower and an upper limit to the dimensions of the magnesite pieces which can be used. Very small pieces, e.g. magnesite powder or fines, would be unacceptable since these would cause plugging and loss of permeability of the bed to the reactant gases. Conversely, magnesite pieces of dimensions greater than about 1/12 of the reactor diameter could lead to bridging of the reactor. This would be undesirable in continuous operation where the charge is descending (albeit slowly) down the bed. It is therefore apparant that there will in general be a preferred range of particle dimension bonded by the above constraints. The optimum size and range of sizes used will depend on details such as the scale of operation, the reactor diameter and the rate of throughput. For example, a laboratory-scale reactor of diameter 40 mm might typically be fed with magnesite chips, substantially powder-free, of size 3 mm or less, whilst a production-scale reactor of diameter 600 mm might typically be fed with magnesite lumps, substantially powder free, of size 50 mm or less.

The packed bed reactor is preferably operated on a continuous basis such that the magnesite pieces are fed in at the top and the reactant gases, chlorine and carbon monoxide, are introduced at the bottom. Fused magnesium chloride is drained counter-current to the reactant gases from the bottom of the packed bed reactor.

The reaction temperature is within the range between the melting point of $MgCl_2$ (i.e. about 714° C.) and 1200° C. although it will be understood that the presence of impurities in the feed material may depress the minimum operating temperature.

Preferably the temperature in the reactor is maintained between 800° and 1200° C., more particularly between 800° C. and 1000° C.

Gaseous chlorine and carbon monoxide are preferably introduced to the reactor in a ratio that provides the stoichiometric quantities for converting $MgCO_3$ to $MgCl_2$ and $CO_2$ as set out in equation (1) defined above.

Slight departures from the stoichiometric ratio of reactant gases may be preferred, depending on the operation conditions. For example, it may be desirable to minimise $Cl_2$ in the off-gas in which case a slight excess of carbon monoxide is used. Conversely, the amount and behaviour of impurities in the magnesite feed may dictate the use of a slight excess of chlorine. Magnesite typically contains a number of minor impurities, of which $SiO_2$, $Fe_2O_3$, $Al_2O_3$ and $CaO$ are usually the more important. The first three oxides are likely to be chlorinated and volatilised as $SiCL_4$, $FeCl_2$ or $FeCl_3$, and $AlCl_3$ respectively. The calcium oxide is also likely to be chlorinated and leave the reactor in fused form with the magnesium chloride. Efficient chlorination and removal by volatilisation of $SiO_2$, $Fe_2O_3$ and $Al_2O_3$ will be favoured by a slight excess of chlorine: in the case of $Fe_2O_3$ this will tend to result in the formation of the much more volatile $FeCl_3$, rather than $FeCl_2$.

At the reaction temperatures according to the present invention the magnesium carbonate feed material will decompose to form magnesium oxide with evolution of carbon dioxide. However, this decomposition does appear to provide a porous and active form of magnesium oxide particularly susceptible to concurrent or successive carbochlorination by the $Cl_2/CO$ input and does not affect the overall energy considerations.

Magnesite, chlorine and carbon monoxide are preferably introduced to the reactor in a dry state.

Magnesite, chlorine and carbon monoxide are preferably introduced to the reactor at ambient temperature. Assuming a continuous operation and no heat losses, the net heat evolution from the overall reaction summarised in equation (1) is sufficient to allow a reaction temperature of circa 920° C. to be attained. Heat losses will, of course, occur in practical industrial scale operation. However, such losses may be offset by allowing the hot $CO_2$ off-gas to pass through the in-coming magnesite pieces. Conveniently, the heat-transfer is effected in a zone at the top of the packed bed reactor. Thus the energy requirements for the method in accordance with the invention are low, particularly within the preferred reaction temperature range. This is because the energy consumed in the heating up of the magnesite, carbon monoxide and chlorine plus the energy consumed in the decomposition of magnesium carbonate is substantially balanced by the energy released by the chlorination of MgO in the presence of CO. Fused magnesium chloride is drained off the packed bed chlorination reactor and may then be passed to an electrolytic cell in which chlorine is regenerated for recycle and magnesium is liberated at the cathode. The presence of a small quantity of $CaCl_2$ in the magnesium chloride input to the electrolytic cell should not create serious problems since $CaCl_2$ is normally an important constituent of the electrolyte.

The off-gas from the chlorination reaction under the most preferred conditions will consist almost entirely of $CO_2$, but may contain small quantities of CO, $CL_2$, $MgCl_2$, $FeCl_3$, $FeCl_2$, $AlCl_3$ and $SiCl_4$. It is preferred that the off-gas is contacted in the packed bed reactor with in-coming magnesite in order to cool the gas sufficiently to extract most of the $MgCl_2$ but not enough to start extracting the minor chloride. After the off-gas has left the packed bed reactor, it may be subjected to a treatment comprising successive condensation of the minor chlorides followed by removal of any residual chlorine before putting the $CO_2$ to stack. The chlorine may either be removed by scrubbing, or may be condensed out and recycled to the reactor. If desired the off-gases may first be subjected to the scrubbing treatments and then recycled to the reactor with the incoming feed material The calculated heat balances for the reactions according to equations (1) and (2) are compared in the following Table.

carbonate (equation 1) makes the route even more favourable from energy considerations.

A particular embodiment of the process according to the invention wherein energy requirements are minimised as described in the following with reference to the accompanying flowsheet, FIG. 1.

FIG. 1 is a simplified flow-sheet for the process, and demonstrates a particular embodiment of the invention, viz. operation with a slight excess of chlorine to facilitate volatilisation of the impurities present in the magnesite ($Fe_2O_3$, $SiO_2$, $Al_2O_3$) as chlorides. Inputs to the system are given in the left-hand column and outputs are in the right-hand column.

A feed material comprising screened solid magnesite pieces ($MgCO_3$ plus impurities) was fed to the top of a packed-bed reactor (A) which has two distinct zones which are the carbochlorination zone A(i), with gaseous CO and $Cl_2$ being fed in countercurrent to the product molten $MgCl_2$ which is tapped off from the bottom of the reactor and the magnesite pre-heating zone A(ii) which is provided in the top section of the packedbed reactor. The incoming magnesite is heated up and decomposed by the hot $CO_2$ off-gas flowing upwards from the carbochlorination zone A(i). Thus, it is not necessary to provide a separate preheater for the magnesite. The effluent gas stream leaving the preheating zone A(ii) consists mainly of $CO_2$, with smaller amounts of unreacted $Cl_2$ and minor chlorides represented by the symbol (X) in the flow sheet such as $FeCl_3$, $AlCl_3$ and $SiCl_4$. It is important that the temperature of the preheating zone A(ii) is maintained sufficiently low to trap out any $MgCl_2$ vapour passing upwards from the carbochlorination zone A(i), whilst being hot enought to allow the minor chlorides to pass through in the vapour state. The effluent gas stream is routed through condensers (B, C and D) which are maintained at progressively lower temperatures in which $FeCl_3$ (sublimation temperature=315° C.), $AlCl_3$ (sublimation temperature=178° C.) and $SiCl_4$ (boiling point=58° C.) are successively condensed. Residual $Cl_2$ is removed from the gas stream at E and the final effluent gas ($CO_2$) is put to stack. If only traces of chlorine are present, E may simply be a packed tower in which water is used to scrub out the chlorine, the spent liquor being neutralised before disposing. Alternatively, it may be desirable to recover $Cl_2$ for recycle (as shown by the arrowed, dashed line in FIG. 1) in which case E will take the form of a compression/refrigeration unit.

The invention is illustrated by the following Examples 1 to 7 which for convenience have been carried out on a batch basis. Example 7 is included for comparison

TABLE

| Reaction | Overall Heat Balance (K cal/mole $MgCO_3$) | | | | |
| --- | --- | --- | --- | --- | --- |
|  | 1000° K. 727° C. | 1100° K. 827° C. | 1200° K. 927° C. | 1300° K. 1027° C. | 1400° K. 1127° C. |
| $MgCO_3 + CO + Cl_2 \rightarrow$ $MgCl_2 + 2CO_2$ (equation 1) (Reactants introduced cold) | −9.4 | −4.8 | +0.2 | +4.7 | +9.7 |
| $MgCO_3 + C + Cl_2 \rightarrow$ $MgCl_2 + CO +$ $CO_2$ (equation 2) (Reactants cold) | +28.9 | +33.2 | +37.5 | +41.7 | +46.0 |

In the table:
− indicates a net evolution of heat from the reaction
+ indicates a net heat requirement.

As the calculations show more energy is required for the route using carbon than that using carbon monoxide. Supplying heat to carbon monoxide and magnesium purposes and illustrates an operation which uses a magnesium carbonate melt rather than solid pieces.

EXAMPLE 1

Figure 2:
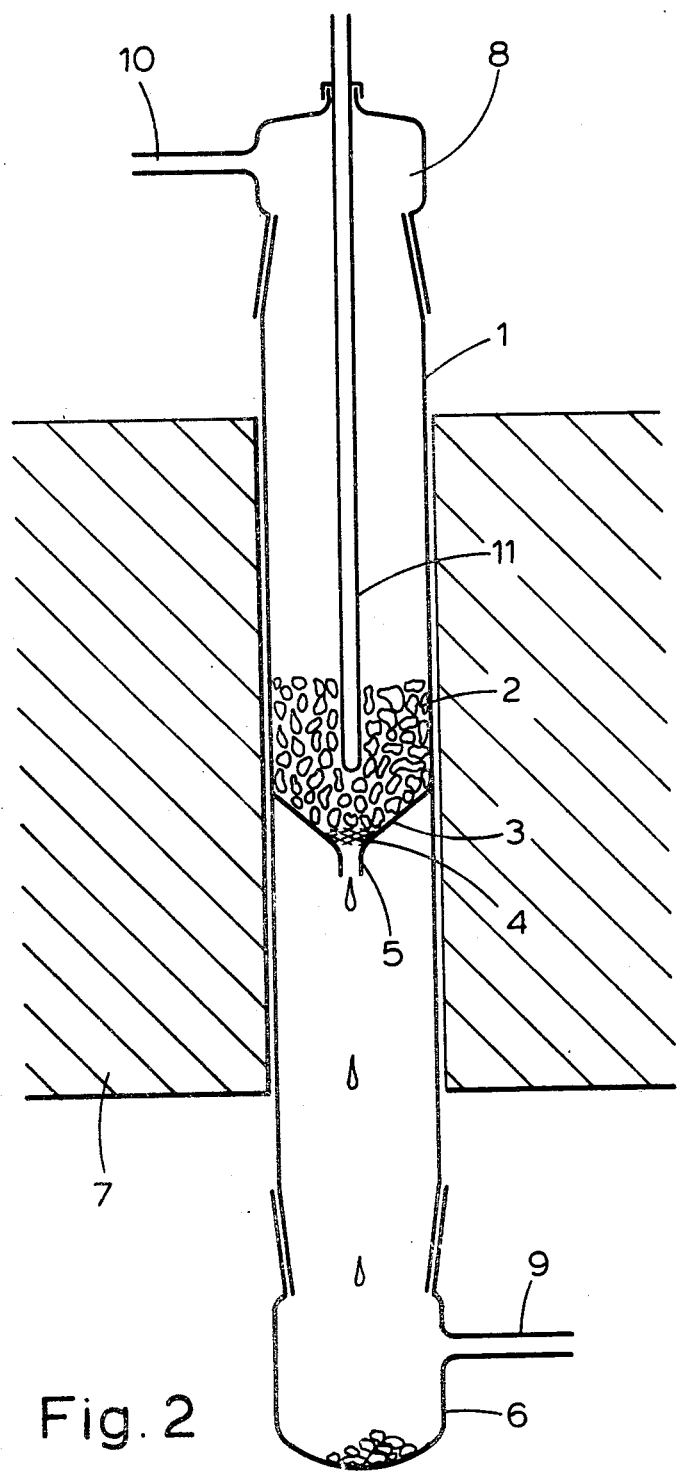

The reactor used in this example is shown diagrammatically in FIG. 2. The reactor tube (1) was 440 mm high and had an internal diameter of 40 mm. The magnesite pieces (2) were supported on a funnel-shaped support surface (3), the neck of which was fitted with a piece of silica wool (4) to prevent pieces of magnesite falling onto the tubular outlet portion (5). The funnel was 15 mm deep (measured from the seal at the top, to the neck of the outlet tube). The outlet tube (5) was 5 mm long and had an internal diameter of 5 mm. A removable collector vessel (6) was located below the outlet tube to collect the magnesium chloride product from the reactor. 50 grams of magnesite pieces ($-7+10$ mesh) were charged to the pre-weighed reactor tube. This gave a bed-depth of 25 mm. The tube was then inserted into a furnace (7), the head (8), collector vessel (6) and gas train connections (9), (10), were assembled and the bed was heated up to 1000° C. measured by thermocouple (11) while passing dried nitrogen through it via conduit (9).

At the start of the run, the nitrogen was stopped and stoichiometric amounts of carbon monoxide and chlorine at 50 mls/minute each were passed through the bed (2) for 189 minutes (i.e. 65% of theoretical total reaction time). During the run the bed temperature rose by 12° C., due to the exothermic nature of the reaction, giving an overall temperature range of 1000°–1012° C. throughout the run.

At the end of the run the reactor tube (1) and contents were cooled to room temperature under dried nitrogen and re-weighed. The extent of reaction was then determined from the final weights of the bed residue and $MgCl_2$ collected using the equation $$w = 23.8 [1 + (1.375p/100)]$$

wherein w is the final total weight of the bed residue plus product $MgCl_2$ and p=the percentage of magnesite converted into $MgCl_2$. The calculated percentage conversion was 51.3%. The chlorine utilization (% overall) was 78.8%. The time taken from the start of the run to the first appearance of $MgCl_2$ in the collection vessel was 114 minutes. The rate of formation of $MgCl_2$ after the first drop appeared in the collector was $2.13 \times 10^{-3}$ moles/minute. Chlorine utilization from the appearance of the first drop of $MgCl_2$ to the end of the run (i.e. output chloride as a percentage of input chlorine) was circa 100% X-ray diffraction examination of the $MgCl_2$ product showed a sharp pattern identified as anhydrous $MgCl_2$, with no extraneous features attributable to impurities.

EXAMPLE 2

Example 1 was repeated, except for running at an initial temperture of 1100° C. and for a period of 165 minutes (=57% of theoretical reaction time). The bed temperature rose by 15° C. during the run. $MgCl_2$ was again collected in the collecting vessel and gave the same X-ray diffraction results as for Example 1. The percentage of $MgCO_3$ converted to $MgCl_2$ was 39.7%; chlorine utilisation was 69.9%. The time taken to the first appearance of $MgCl_2$ in the collecting vessel was 120 minutes. The rate of formation of $MgCl_2$ after the first drop appeared (mole/min) was $2.15 \times 10^{-3}$. Chlorine utilisation from the appearance of the first drop of $MgCl_2$ until the completion of the run (i.e. output chloride as a percentage of input chlorine) was circa 100%.

EXAMPLE 3

Example 1 was again repeated, except for a running at an initial temperature of 900° C. and for a period of 301 minutes (104% of theoretical reaction time). The bed temperature rose by 20° C. during the run. $MgCl_2$ was again collected in the collecting vessel and gave the same X-ray diffraction results as for Example 1. The percentage of $MgCO_3$ converted was 58.7%. Chlorine utilisation was 57%. The time taken to the first appearance of $MgCl_2$ in the collecting vessel was 124 minutes. The rate of formation of $MgCl_2$ after the first drop appeared (mole/min) was $1.43 \times 10^{-3}$. Chlorine utilisation from the appearance of the first drop of $MgCl_2$ until the completion of the run (i.e. output chloride as a percentage of input chlorine) was 70%.

EXAMPLE 4

Example 1 was again repeated, except for running at an initial temperature of 801° C. and for a period of 138 minutes (48% of theoretical reaction time). The bed temperature rose by 24° C. during the run. $MgCl_2$ was again collected in the collecting vessel and gave the same X-ray diffraction results as for Example 1. The percentage of $MgCO_3$ converted was 15.1%. Chlorine utilisation was 31.7%. The time taken to the first appearance of $MgCl_2$ in the collecting vessel was 93 minutes. The rate of formation of $MgCl_2$ after the first drop appeared (mole/min) was $1.21 \times 10^{-3}$. Chlorine utilisation from the appearance of the first drop of $MgCl_2$ until the completion of the run (i.e. output chloride as a percentage of input chlorine) was 58.2%.

EXAMPLE 5

Example 1 was again repeated, except for running at an initial temperature of 765° C. and for a period of 160 minutes (55% of theoretical reaction time). The bed temperature rose by 33° C. during the run. $MgCl_2$ was again collected in the collecting vessel and gave the same X-ray diffraction results as for Example 1. The percentage of $MgCO_3$ converted was 39.1%. The time taken to the first appearance of $MgCl_2$ in the collecting vessel was 115 minutes. The rate of formation of $MgCl_2$ after the first drop had appeared (mole/min) was $1.53 \times 10^{-3}$. Chlorine utilisation from the appearance of the first drop of $MgCl_2$ until the completion of the run (i.e. output chloride as a function of input chlorine) was 74.7%.

EXAMPLE 6

Example 1 was again repeated, except for running at an initial temperature of 715° C. and for a period of 174 minutes (60% of theoretical reaction time). The bed temperature rose by 20° C. during the run. $MgCl_2$ was again collected in the collecting vessel and gave the same X-ray diffraction results as for Example 1. The percentage of $MgCO_3$ converted was 36.7%. Chlorine utilisation was 61.2%. The time taken to the first appearance of $MgCl_2$ in the collecting vessel was 164 minutes. The apparent rate of formation of $MgCl_2$ after the first drop appeared (mole/min) was $4.34 \times 10^{-3}$. The apparent chlorine utilisation from the appearance of the first drop of $MgCl_2$ until the completion of the run was 212%. This anomalously high apparent chlorine utilisation was due to the initial surge of $MgCl_2$ into the receiver, coupled with the very short time allowed for MgCl$_2$ collection.

EXAMPLE 7
(COMPARISON)

Molten magnesium chloride was held in a silica crucible (internal diameter 36 mm, depth 115 mm) enclosed in a gas-tight silica vessel, which in turn was surrounded by a vertical-tube furnace. The reactant gases (i.e. CO+CL$_2$) were introduced into the molten salt via a silica tube. The crucible had a frusto-conical base and the tip of the silica tube had a corresponding taper, to facilitate melt/solid agitation by gases emerging from the tip of the tube.

The molten magnesium chloride was heated up to 900° C. 12.5 grams of powdered magnesite was added to the melt; CO and Cl$_2$ were then bubbled through the melt each at a rate of 50 mls/minute, for a period of 91 minutes (126% of theoretical reaction time for complete reaction). At completion of the run the crucible contents were leached with boiling distilled water and the insoluble residue was filtered dried and weighed as MgO. The resultant weight indicated zero chlorination of the input magnesite.

We claim:

1. A process for the preparation of anhydrous magnesium chloride, the process comprising adding magnesium carbonate pieces to a reactor vessel and heating the pieces to a temperature above about the melting point of magnesium chloride and below about 1200° C. to form a heated packed bed comprising the heated pieces; reacting the heated pieces in the packed bed with gaseous chlorine in the presence of gaseous carbon monoxide; withdrawing carbon dioxide from above the packed bed and withdrawing molten anhydrous magnesium chloride from below the packed bed.

2. The process according to claim 1, wherein the temperature is maintained between about 800° C. and about 1200° C.

3. The process according to claim 2, wherein the temperature is maintained between about 800° C. and about 1000° C.

4. The process according to claim 1, wherein the magnesium carbonate pieces are of a dimension not greater than about 1/12th of the diameter of the packed bed reactor.

5. The process according to claim 1 wherein the process is continuous and comprises continuously adding magnesium carbonate pieces to the packed bed and continuously passing gaseous chlorine and gaseous carbon monoxide upwardly through the packed bed, and wherein the carbon dioxide and magnesium chloride are continuously withdrawn.

6. The process according to claim 5 wherein the magnesium carbonate pieces are pieces of magnesium carbonate ore.

7. The process according to claim 6, wherein the packed bed consists of the heated pieces of magnesium carbonate ore.

8. A continuous process for the preparation of anhydrous magnesium chloride, the process comprising preheating magnesium carbonate ore pieces and feeding such pieces into a packed bed reactor comprising heated magnesium carbonate ore; passing carbon monoxide and chlorine gas upwardly through the packed bed, the packed bed being maintained at a temperature in the range above about the melting point of magnesium chloride and below about 1200° C.; continuously removing molten magnesium chloride from beneath the packed bed; continuously removing residual solids from the lower portion of the packed bed while removing a gas from above the packed bed, the gas comprising carbon dioxide; continuously passing the carbon dioxide through a preheating zone while simultaneously continuously passing magnesium carbonate ore pieces through the preheating zone to form preheated and decomposed magnesium carbonate ore pieces and removing cooled carbon dioxide.

9. The continuous process according to claim 8 wherein the temperature is maintained between about 800° C. and about 1000° C.

10. The continuous process according to claim 8, wherein the preheating zone is provided in the packed bed reactor.

11. The continuous process according to claim 8, wherein the overhead gas from the packed bed reactor comprises in addition to carbon dioxide, minor chlorides selected from the group consisting of magnesium chloride vapor, aluminum chloride vapor, iron chloride vapor, silicon chloride vapor and mixtures thereof; and wherein the process comprises cooling the overhead gas in the preheating zone sufficiently to deposit magnesium chloride without depositing minor chlorides, removing the magnesium chloride from the preheating zone, removing the partially cooled gas from the preheating zone and separating the remaining chloride vapors from the gas so as to remain with incondensible gases in the gas phase.

12. The continuous process according to claim 8, wherein the magnesium carbonate is screened such that the pieces are of a dimension not greater than about 1/12th of the diameter of the packed bed before feeding into the packed bed reactor.

13. The process according to claim 8 wherein the packed bed consists of heated pieces of magnesium carbonate ore.

* * * * *